US010465689B2

(12) United States Patent
Crom

(10) Patent No.: US 10,465,689 B2
(45) Date of Patent: *Nov. 5, 2019

(54) PUMP SYSTEM FOR HIGH PRESSURE APPLICATION

(71) Applicants: Tucson Embedded Systems, Inc., Tuscon, AZ (US); Turbine Powered Technology, LLC, Franklin, LA (US)

(72) Inventor: Elden Crom, Tucson, AZ (US)

(73) Assignees: Tucson Embedded Systems, Inc., Tucson, AZ (US); Turbine Powered Technology, LLC, Franklin, LA (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/794,437

(22) Filed: Oct. 26, 2017

(65) Prior Publication Data

US 2018/0045202 A1 Feb. 15, 2018

Related U.S. Application Data

(63) Continuation of application No. 14/442,039, filed as application No. PCT/US2013/069463 on Nov. 11, 2013, now Pat. No. 9,829,002.

(Continued)

(51) Int. Cl.
| F04D 13/00 | (2006.01) |
| F04D 13/14 | (2006.01) |
| F04D 29/28 | (2006.01) |
| F04D 7/04 | (2006.01) |
| F04D 29/22 | (2006.01) |
| F04D 29/42 | (2006.01) |
| E21B 43/26 | (2006.01) |
| F04D 13/02 | (2006.01) |
| F01D 15/08 | (2006.01) |
| F04D 1/06 | (2006.01) |

(Continued)

(52) U.S. Cl.
CPC .............. *F04D 13/14* (2013.01); *E21B 43/26* (2013.01); *F01D 15/08* (2013.01); *F04D 1/06* (2013.01); *F04D 7/04* (2013.01); *F04D 13/02* (2013.01); *F04D 29/043* (2013.01); *F04D 29/22* (2013.01); *F04D 29/2255* (2013.01); *F04D 29/2294* (2013.01); *F04D 29/289* (2013.01); *F04D 29/426* (2013.01); *F04D 29/4273* (2013.01); *F04D 29/628* (2013.01); *Y02T 50/671* (2013.01)

(58) Field of Classification Search
CPC ...... F04D 13/14; F04D 29/628; F04D 29/426; F04D 29/22; F04D 29/043; F04D 1/06; F04D 13/02; F04D 29/2255; F04D 7/04; F04D 29/4273; F04D 29/2294; F01D 15/08; E21B 43/26

See application file for complete search history.

(56) References Cited

U.S. PATENT DOCUMENTS

| 4,209,278 A | 6/1980 | Cooper et al. |
| 5,599,164 A | 2/1997 | Murray |

(Continued)

*Primary Examiner* — Eldon T Brockman
(74) *Attorney, Agent, or Firm* — Young Basile Hanlon & MacFarlane, P.C.

(57) ABSTRACT

A pump system for high pressure, high volume applications is presented. The pump system includes a turbo-shaft engine having a drive shaft and a high pressure, high RPM centrifugal pump coupled to the drive shaft. In certain embodiments the pump system further includes a second low pressure, high RPM centrifugal pump coupled to the drive shaft.

15 Claims, 8 Drawing Sheets

Related U.S. Application Data

(60) Provisional application No. 61/725,880, filed on Nov. 13, 2012.

(51) Int. Cl.
 *F04D 29/043* (2006.01)
 *F04D 29/62* (2006.01)

(56) References Cited

U.S. PATENT DOCUMENTS

| | | |
|---|---|---|
| 8,944,168 B2 * | 2/2015 | Pettigrew ................ E21B 43/26 166/308.1 |
| 9,115,720 B2 | 8/2015 | Rosinski et al. |
| 2009/0068031 A1 | 3/2009 | Gambier et al. |
| 2012/0205112 A1 * | 8/2012 | Pettigrew ................ E21B 43/26 166/308.1 |
| 2012/0219411 A1 | 8/2012 | Hein et al. |
| 2012/0255734 A1 | 10/2012 | Coli et al. |
| 2013/0294928 A1 | 11/2013 | Rosinski et al. |

\* cited by examiner

PUMP SYSTEM FOR HIGH PRESSURE APPLICATION

CROSS-REFERENCE TO RELATED APPLICATIONS

This application is a continuation of, and claims the benefit of and priority to, U.S. patent application Ser. No. 14/442,039, filed on May 11, 2015, which is a National Stage Entry of International Application No. PCT/US2013/069463, filed on Nov. 11, 2013, which claims the benefit of and priority to U.S. Provisional Patent Application Ser. No. 61/725,880, filed on Nov. 13, 2012. The entire contents of each of the above-identified applications are hereby incorporated by reference.

FIELD

The present invention relates generally to pump systems for high pressure pumping applications, and more particularly to pump systems for hydraulic fracturing.

BACKGROUND

Traditionally, high pressure, high volume pumping applications use diesel reciprocating engines to drive a reciprocating pump. In the field of hydraulic fracturing, or fracking, conventional diesel reciprocating engines have been replaced with turbine engines because the lower weight and easier deployment of turbine engines allow for improved speed of delivery, deployment, and uptime. As a result, pump system designs for hydraulic fracturing utilize a high speed take-off from a turbine engine (e.g., approaching 15000 RPM), through a gear reduction box, and into a reciprocating pump. The primary inefficiencies in such systems come from the gearbox (e.g., about 8% loss for an 8:1 gear reduction ratio) and the reciprocating pump (e.g., about 6% loss). As a result, the total loss in such systems from an output shaft of the engine to the total hydraulic horsepower is about 14%. In addition, while turbine engines provide an improvement over conventional diesel engines, the entire system, including the turbine engine, gearbox, and reciprocating pump still requires a relatively large footprint on a truck or trailer bed in mobile pumping applications.

Therefore, there is a need for a high efficiency, small footprint pump system for high pressure pumping applications.

BRIEF DESCRIPTION OF THE DRAWINGS

Embodiments of the invention will become more apparent from the detailed description set forth below when taken in conjunction with the drawings, in which like elements bear like reference numerals.

SUMMARY

In one implementation, a pump system for high pressure, high volume applications is presented. The pump system includes a turbo-shaft engine having a drive shaft and a high pressure, high RPM centrifugal pump coupled to the drive shaft. In certain embodiments the pump system further includes a second low pressure, high RPM centrifugal pump coupled to the drive shaft.

In another implementation, a high pressure pump system is presented. The system includes multiple pump systems each having a turbo-shaft engine having a drive shaft, and a first centrifugal pump coupled to the drive shaft. The multiple pump systems are then mounted to a platform in either a horizontal, vertical, or angled vertical position. In certain embodiments, the system includes four or more pump systems.

In another implementation, a method of performing high pressure, high volume pumping applications is presented. The method includes providing a system having multiple pump systems each having a turbo-shaft engine having a drive shaft, and a first centrifugal pump coupled to the drive shaft. The multiple pump systems are mounted to a platform in either a horizontal, vertical, or angled vertical position. The method further includes pumping a fluid at an output pressure greater than 5000 psi.

DETAILED DESCRIPTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
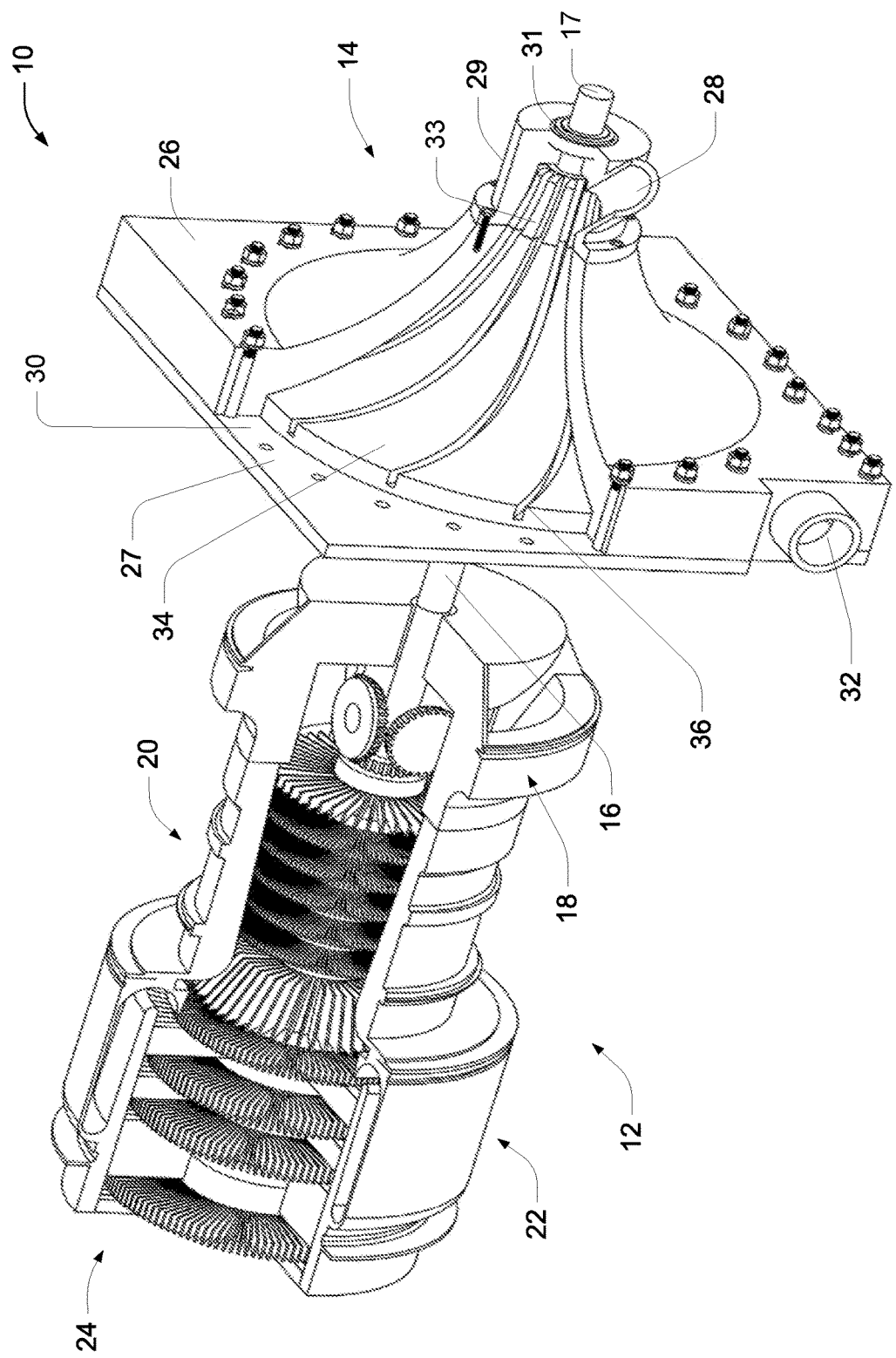
FIG. 1 illustrates a first pump system according to Applicant's invention.

Applicant's invention includes a pump system for high pressure applications. Such applications, including but not limited to hydraulic fracturing applications, can require pressures greater than about 5000 pounds per square inch (psi) and volumes greater than about 55 barrels per minute in aggregate. Turning now to FIG. 1, an exemplary illustration of the pump system 10 of Applicant's invention is presented with a portion of the pump system housing cut-away for illustrative purposes only. As shown in FIG. 1, the pump system 10 includes a turbo-shaft engine 12 and a centrifugal pump 14. As will be appreciated, turbo-shaft engines are a type of high RPM (rotations per minute) gas turbine engines which are optimized to produce shaft power and are commonly used in military vehicular applications, such as in helicopters, ships, tanks, and hovercraft. As used herein, "high RPM" refers to at or greater than 13,000 RPM. In certain embodiments, the turbo-shaft engine 12 runs at greater than 15,000 RPM. In certain embodiments, the turbo-shaft engine 12 runs at greater than 20,000 RPM. In certain embodiments, the turbo-shaft engine 12 runs at greater than 30,000 RPM. As illustrated here, the turbo-shaft engine 12 includes a drive shaft 16, an intake section 18, a compressor section 20, a combustion chamber 22, and an exhaust portion 24.

The centrifugal pump 14 is a high pressure high RPM pump that uses a split impeller design comprising a main impeller portion 34 and a secondary impeller portion 33. As used herein, "high pressure" refers to greater than 5000 psi. In certain embodiments, centrifugal pump 14 runs at greater than 10,000 psi. In certain embodiments, centrifugal pump 14 runs at greater than 15,000 psi. In certain embodiments, centrifugal pump 14 runs at greater than 20,000 psi. As is shown in FIG. 1, the centrifugal pump 14 includes a housing comprising the body 26 having an input chamber 28 and an output chamber 32, back plate 27, and a removable cap 29. The pump body 26 and the back plate 27 are held together with multiple mechanical fasters and together form a volute 30, in which the main impeller portion 34 is positioned. The impeller portion 33 is separately housed under the removable cap 29 to allow for serviceability, as will be discussed below.

Figure 2A:
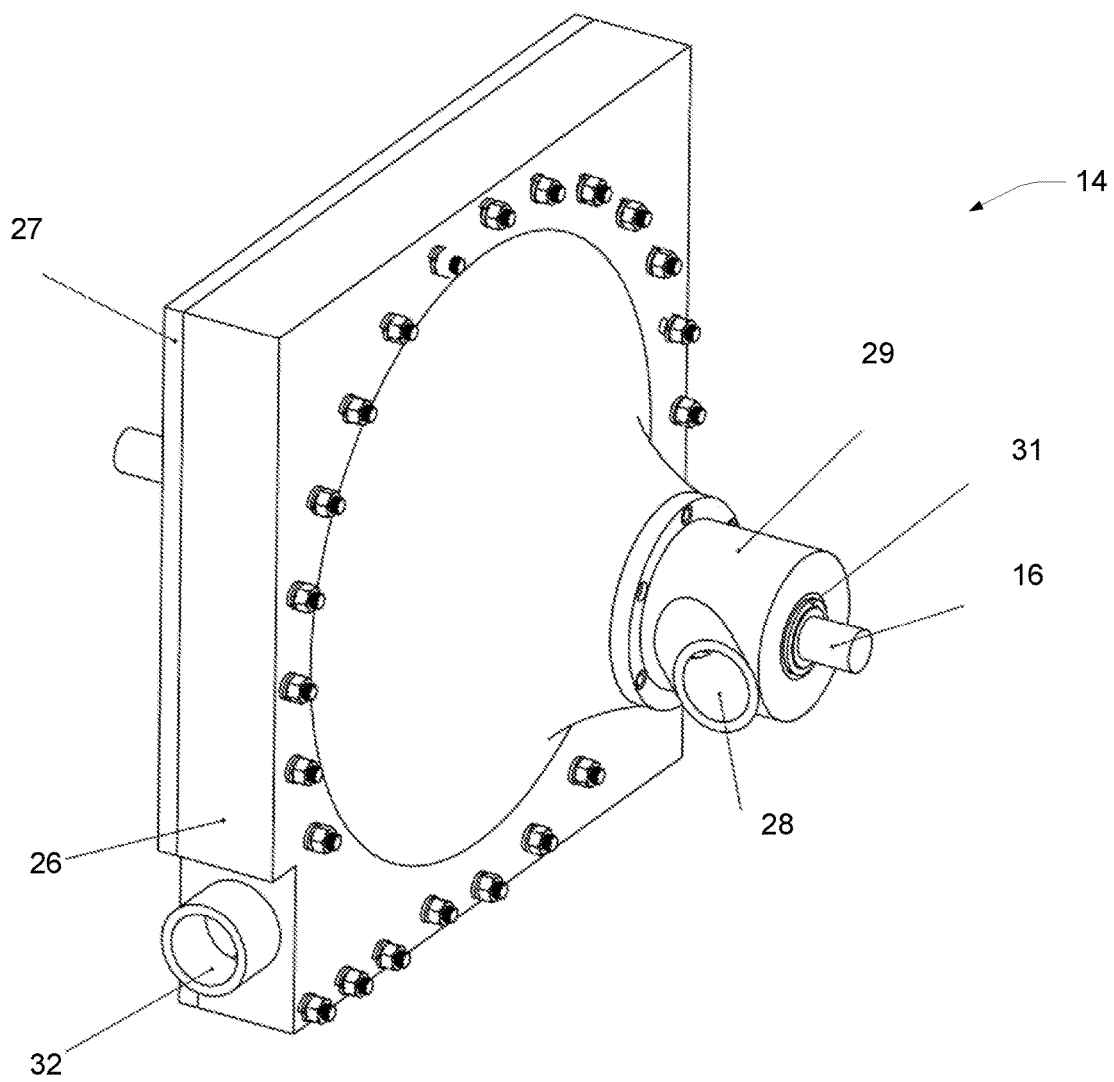
FIGS. 2A-2C illustrate the front, cut-a-way, and back views, respectively, of the centrifugal pump of the pump system illustrated in FIG. 1.
Figure 2B:
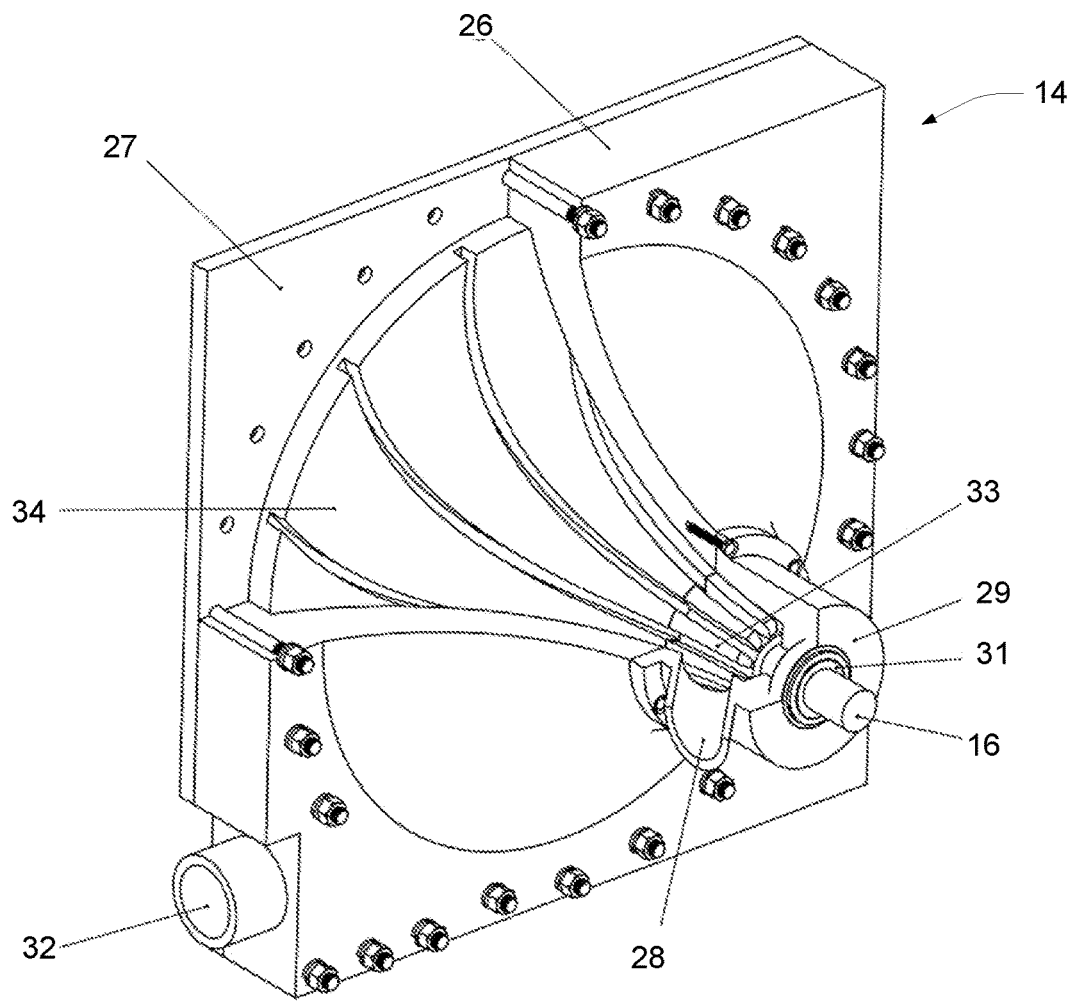
Figure 2C:
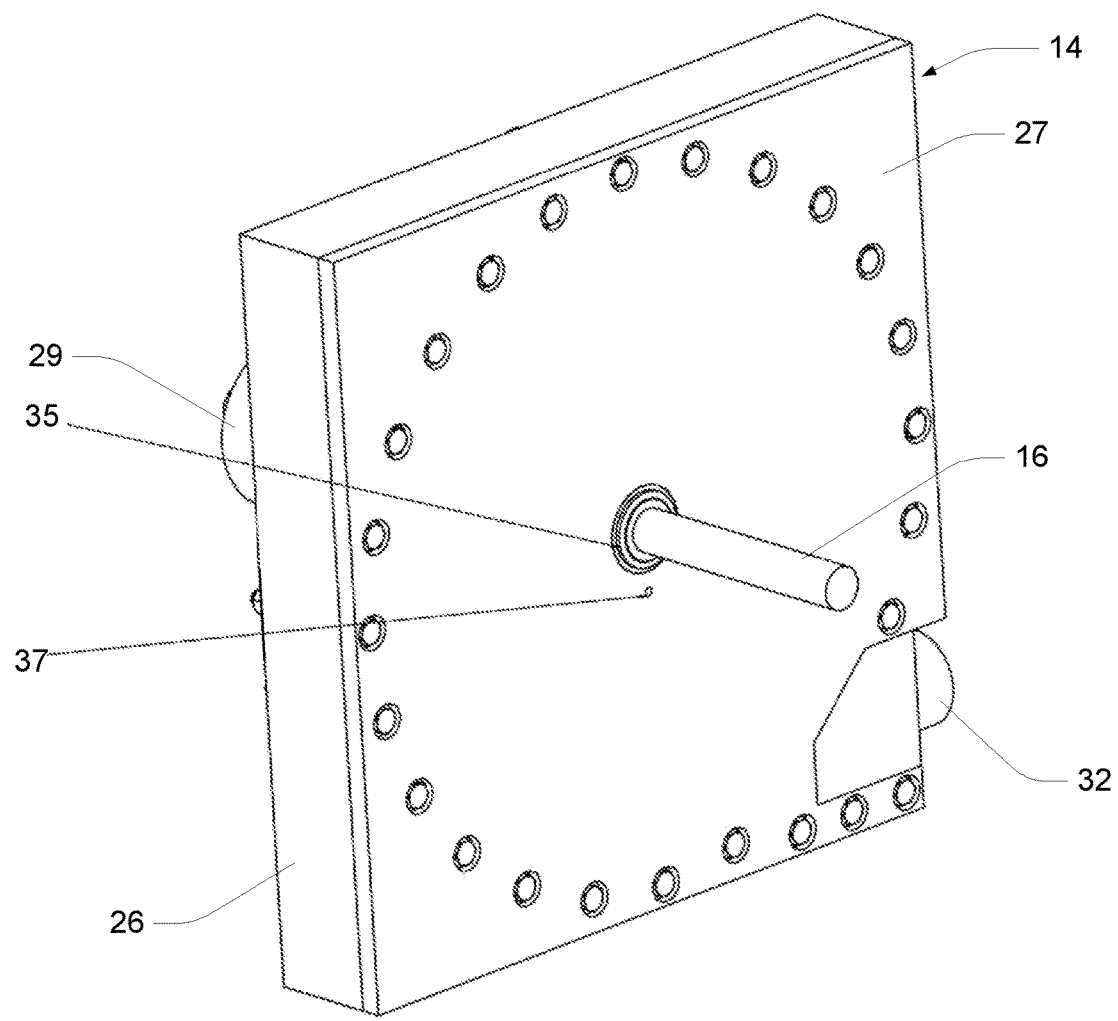

Additional illustrations of centrifugal pump 14 are shown in FIGS. 2A-2C. As can be seen in FIG. 2C specifically, the back plate 27 includes inlet 37 to allow wash water to be injected into pump 14 as necessary to keep debris from accumulating on the back side of impeller portions 33 and 34.

As shown in FIG. 1, the drive shaft 16 can be mechanically coupled to the impeller (portions 34 and 33) via a rotor shaft 17 and coupler 64 (shown in FIG. 6) to drive the impeller for pumping fluid from the input chamber 28 through the output chamber 32. In some embodiments, the rotor shaft 17 can include multiple heat-fitted pieces that, once coupled together, are static with respect to one another. One or more bearings, such as bearings 31 and 35 (FIG. 2C), can be positioned around the rotor shaft 17 to prevent oscillation and vibrations during operation of the pump system 10 and reduce wear on components of the centrifugal pump 14. In some embodiments, one or more engine bearings (not shown) positioned around the drive shaft 16 can replace one or more of the bearings positioned around the rotor shaft 17.

Due to the rotor shaft 17 being the only moving part of the centrifugal pump 14, as well as the lack of valves and internal catch points, the centrifugal pump 14 is generally very durable and requires little maintenance with respect to the industry standard for equipment used in fracking operations. For example, maintenance required for the centrifugal pump 14 can include replating the impeller vanes 36 or internal surfaces of the volute 30, or replacing dynamic or static seals around the rotor shaft. This is substantially less maintenance work than what is necessary for triplex or quadruplex reciprocating pumps, which include multiple moving valves and pistons in comparison to the single moving rotor shaft of the centrifugal pump 14. In addition, due to the lack of valves and internal catch points, the centrifugal pump 14 is capable of pumping fluids including inconsistent mixtures of solids and liquids, such as wet sand mixtures or bentonite clay for hydraulic fracturing applications.

The split impeller design of centrifugal pump 14 further adds to its durability and ease of maintenance. As will be appreciated of the impeller, secondary impeller portion 33 is likely to experience higher wear than main portion 34. Accordingly, the split impeller design and use of removable cap 29 to cover secondary impeller portion 33 allows for easy maintenance and replacement of this portion as needed.

In certain embodiments, the interior of centrifugal pump 14, the main impeller portion 34, the secondary impeller portion 33, and the cap 29 are coated or sleeved with a low friction plastic to help reduce friction and overall wear of the system.

Figure 5:
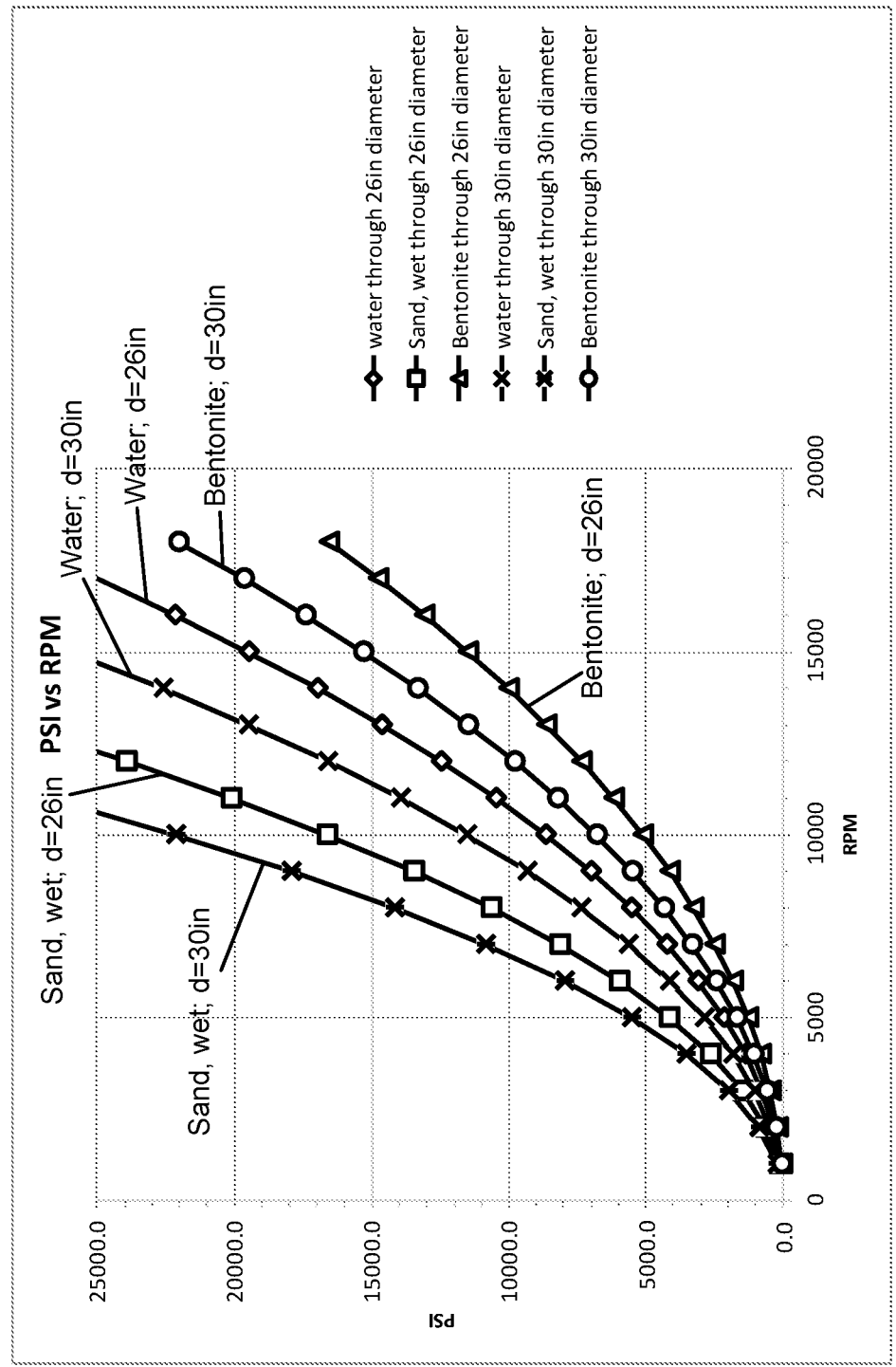
FIG. 5 illustrates a graph of example pump output pressures at different rotational speeds using the disclosed invention.

Referring back to FIG. 1, the impeller is rotated directly by the output shaft 16 to achieve a desired output pressure of fluid through the output chamber 32 (i.e., without requiring an additional gearbox assembly between the turbo-shaft engine 12 and the centrifugal pump 14). In one embodiment, for hydraulic fracturing applications, the turbo-shaft engine 12 drives the shaft 16 at a rotational speed between about 13,000 rotations per minute (RPM) and about 18,000 RPM. In certain embodiments, the main impeller portion 34 has a diameter of about 26 inches at its widest portion and is rotated at the same speed as the shaft 16 to achieve output pressures between about 15,000 pounds per square inch (psi) and about 20,000 psi for fluids with a specific gravity between about 0.59 and about 1.92 (e.g., relative to water with a specific gravity of 1.0). By "about" Applicant means±10%. Additionally, with reference to hydraulic fracturing applications, the pump system 10 includes a 23-inch diameter impeller 34, a 26-inch diameter impeller, a 30-inch diameter impeller, or another suitable size impeller. FIG. 5 illustrates example output pressures of water, wet sand, and bentonite clay pumped at different rotational speeds by pump system 10 including a 26-inch diameter impeller and a 30-inch diameter impeller.

Figure 6:
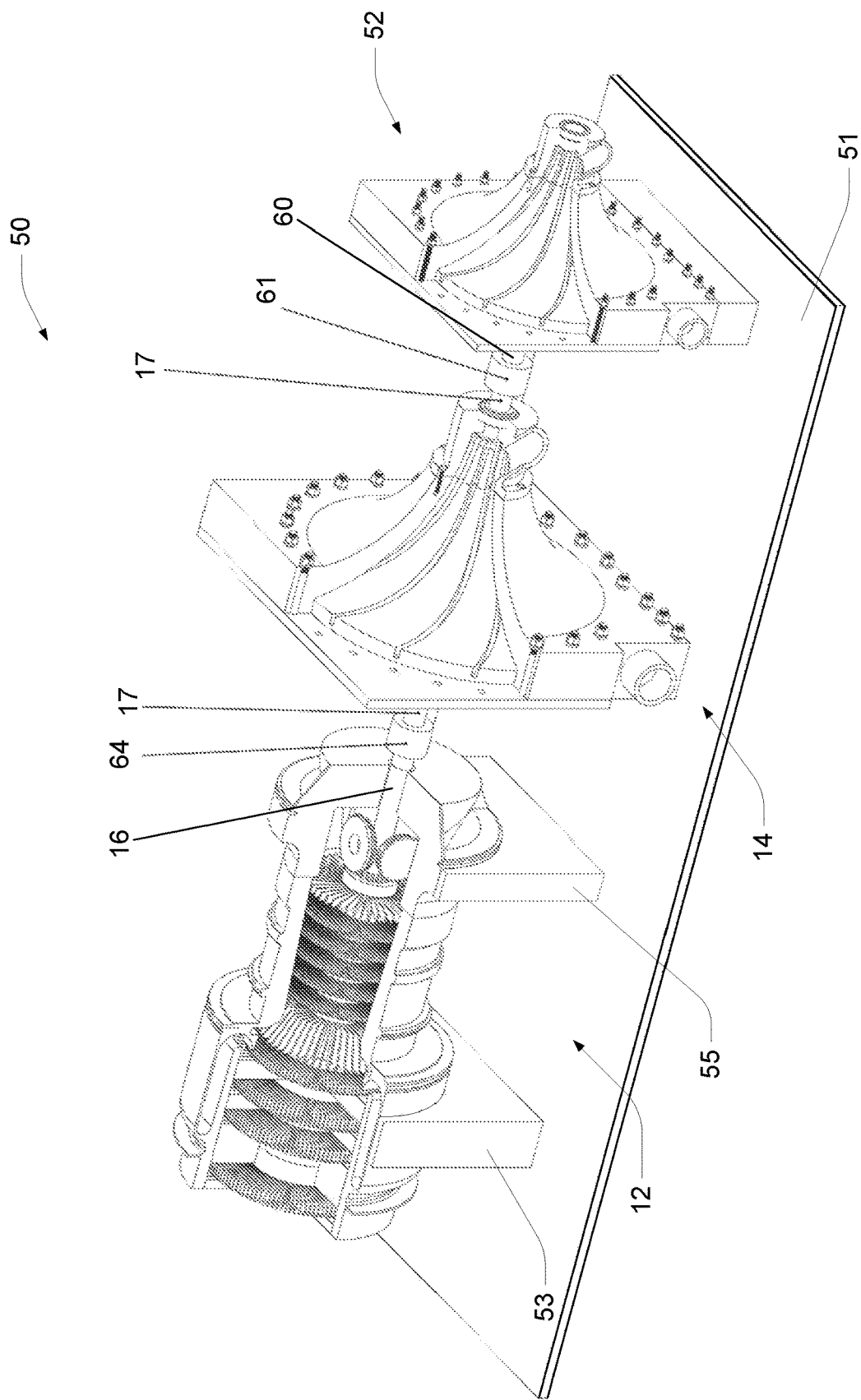
FIG. 6 illustrates a second pump system according to Applicant's invention.

Turning now to FIG. 6, an alternate embodiment of Applicant's pump system is illustrated. As can be seen, the pump system 50 comprises a second centrifugal pump 52 connected to the first centrifugal pump 14 and the turbo-shaft engine 12. This second centrifugal pump 52 is a low pressure high RPM centrifugal pump of the same split impeller design as pump 14. In the present context, "low pressure" refers to pressures below 5000 psi. In certain embodiments, the second centrifugal pump has the same diameter as the first centrifugal pump. In other embodiments, the second centrifugal pump has a different diameter as the first centrifugal pump. In certain such embodiments, the diameter of the second centrifugal pump is smaller than the diameter of the first centrifugal pump. In other such embodiments, the diameter of the second centrifugal pump is larger than the diameter of the first centrifugal pump.

As is shown in FIG. 6, the second centrifugal pump 52 is connected to the first centrifugal pump 14 via coupler 61 and second rotor shaft 60 which drives the second centrifugal pump 52. This second centrifugal pump 52 allows the turbo-shaft engine 12 to run nearer to its optimal RPM range without requiring a transmission. As will be appreciated, transmissions generally are designed to have a high attenuation and dissipate energy. Accordingly, Applicant's pump system 50 is more efficient than those of the prior art.

Additionally, the use of a second centrifugal pump increases the range of fracking operations that Applicant's pump can be used for. Typical fracking operations may require pressures of anywhere from 5000 psi to 15,000 psi.

Most individual centrifugal pumps cannot be safely or efficiently run across that great of a pressure range. By having two centrifugal pumps, Applicant's pump system 50 can safely and efficiently operate at a broad range of pressures.

Figure 3A:
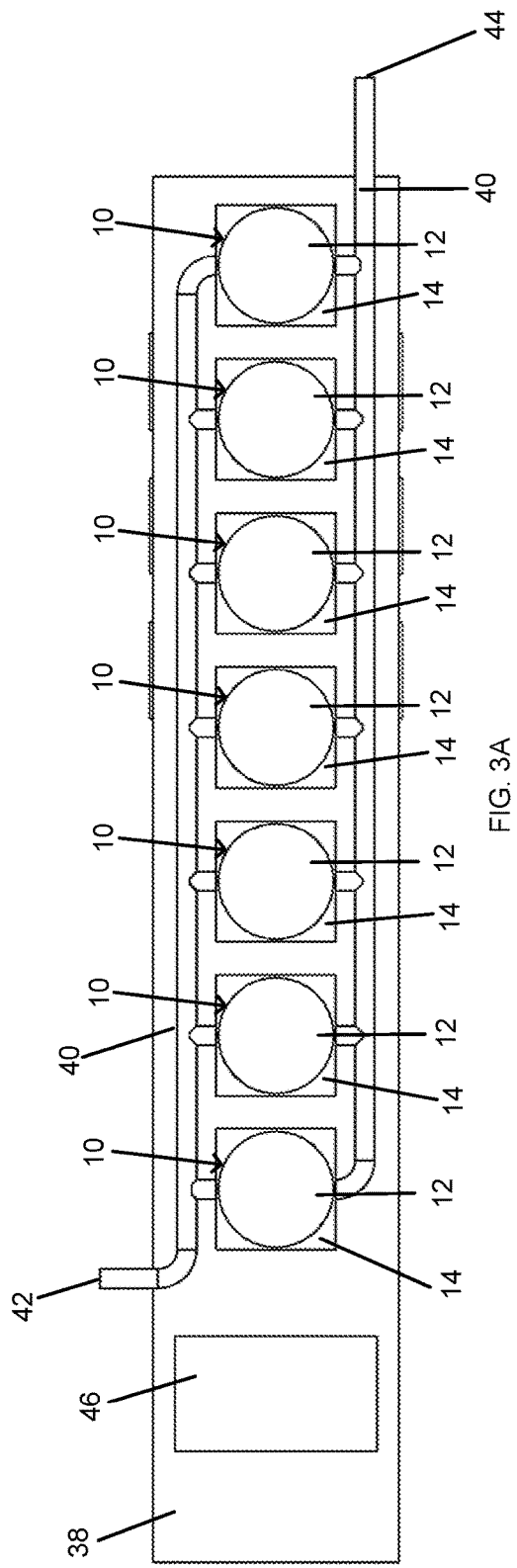
FIGS. 3A and 3B illustrate top and side views, respectively, of a trailer bed including multiple pump systems, in accordance with Applicant's invention.
Figure 3B:
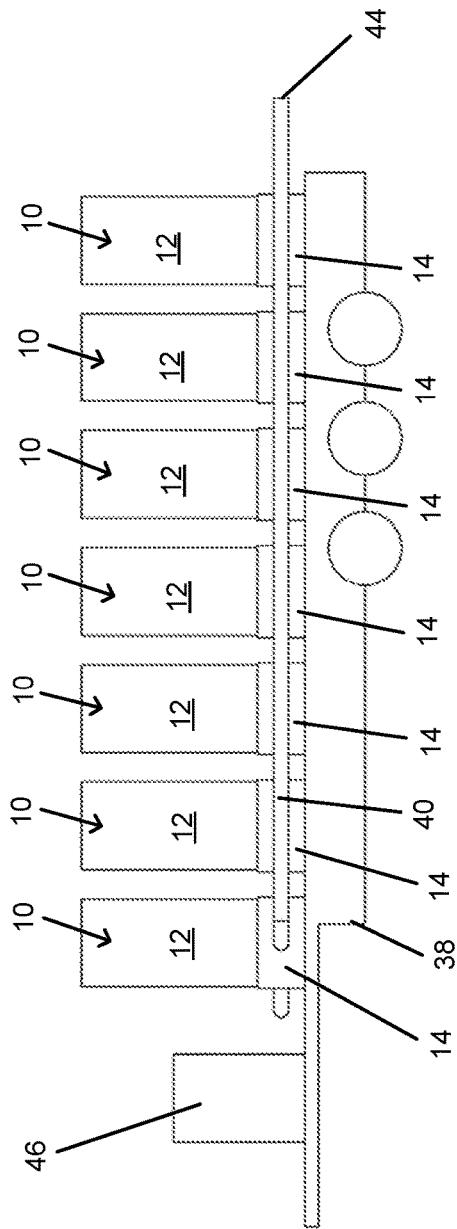

As described above, in certain embodiments the pump system 10 and/or 50 achieves desired impeller speeds and output pressures without requiring a gearbox assembly. As will be appreciated, the elimination of a gearbox assembly greatly reduces the footprint and weight of the pump systems 10 and 50 in comparison to traditional pump systems. This is an advantageous feature for mobile pumping applications, where one or more pump systems are installed on a truck or trailer bed, since smaller individual footprints can allow for additional pumps systems to be installed on the same trailer bed. The elimination of a gearbox, and the ability for the turbo-shaft engine 12 to be mounted horizontally or vertically, also allows for the pump system 10 to be mounted to a truck in a traditional horizontal orientation or a vertical orientation, as shown in FIGS. 3A and 3B. One will appreciate that while FIGS. 3A and 3B are illustrated with pump system 10, the present discussion is equally applicable to pump system 50. By way of illustration and not limitation, FIG. 6 further illustrates pump system 50 mounted horizontally on a platform 51 using braces 53 and 55 to stabilize turbo-shaft engine 12.

FIGS. 3A and 3B illustrate a trailer bed 38 for a hydraulic fracturing application including multiple pump systems 10 mounted in the vertical orientation and connected in parallel by pipe connections 40. In some embodiments, the number of pump systems 10 capable of being mounted on the single trailer bed 38 is between four and seven (as shown in FIGS. 3A-3B and 4A-4B). In other embodiments, the number of pump systems 10 capable of being mounted on a single trailer bed 38 is greater than seven. The pump systems 10 can receive fracking fluid (i.e., from a single inlet 42 to each of the input chambers 28) at a low pressure from one or more slurry blenders (not shown) through the pipe connections 40. The pump systems 10 can then output pressurized fracking fluid (i.e., from each the output chambers 32 to a single outlet 44) through the pipe connections 40 toward a well (not shown).

As shown in FIGS. 3A and 3B, when mounted in the vertical orientation, each pump housing (i.e., a side of the pump housing opposite the turbo-shaft engine 12) can be positioned flat against the trailer bed 38 or against skids on the trailer bed 38. As a result, the output chamber 32 of the pumps 14 can be closer to the ground, which reduces the length of pipe connections 40 necessary for hydraulic fracturing or other ground pump applications. This reduces the overall equipment costs since, in hydraulic fracturing, the pipe connections 40 can be substantially large, including diameters between about 3 inches and about 5 inches. In addition, by positioning the pump systems 10 in the vertical orientation, the exhaust nozzles 24 point straight up so that exhaust is directed up and away from the pump systems 10. In some embodiments, a hatch (not shown) can be positioned over each exhaust nozzle 24 to prevent rain inflow into the turbo-shaft engines 12.

In some embodiments, arranging the pump system 10 in the vertical orientation reduces the stress on the dynamic seal between the rotor shaft and the pump housing, which is often the most maintenance prone component of the centrifugal pump 14. To achieve proper operation of the centrifugal pump 14 without the dynamic seal, the area between the turbo-shaft engine 12 and the pump housing can be enclosed and an internal cavity created by the enclosure (i.e., around the shaft 16) can be filled with air pressurized to match the pressure of fluid entering the input chamber 28. For example, in hydraulic fracturing applications, the air can be pressurized to match the pressure of fracking fluid entering the input chamber 28 (i.e., the input pressure) from the slurry blenders. In those embodiments which include a dynamic seal, the internal cavity surrounding the shaft 16 is pressurized at or above the input pressure and a weep hole is provided so that, when the dynamic seal around the shaft 16 is violated due to wear and tear, the leaked pumping fluid can be collected. In hydraulic fracturing applications, or other pump applications, this weeped material is fed back into the slurry blenders to prevent unnecessary waste.

Figure 4A:
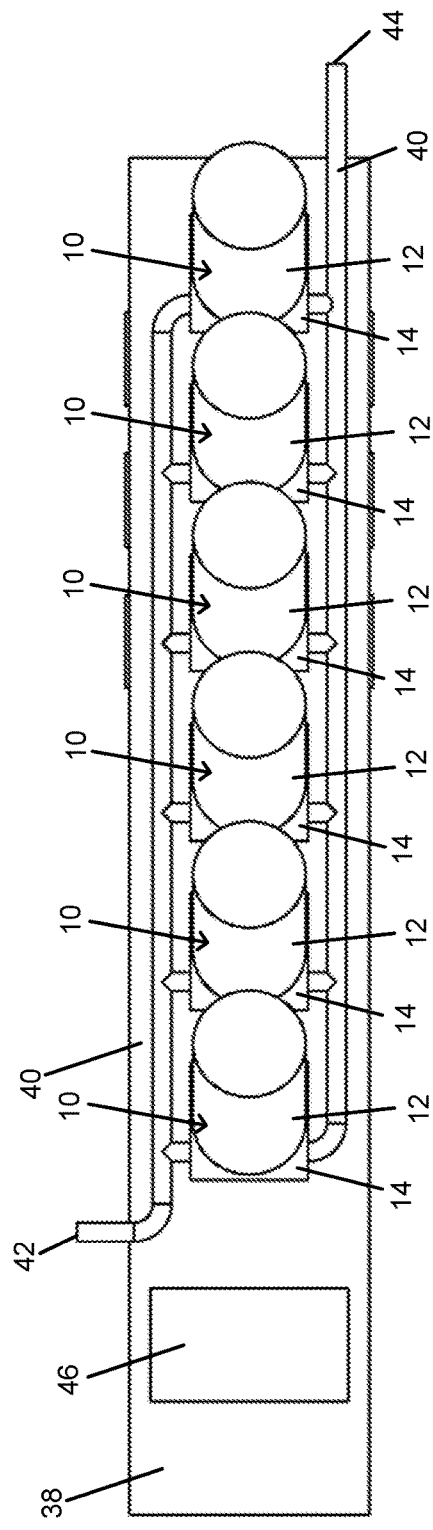
FIGS. 4A and 4B illustrate top and side views, respectively, of another trailer bed including multiple pump systems, in accordance with Applicant's invention.
Figure 4B:
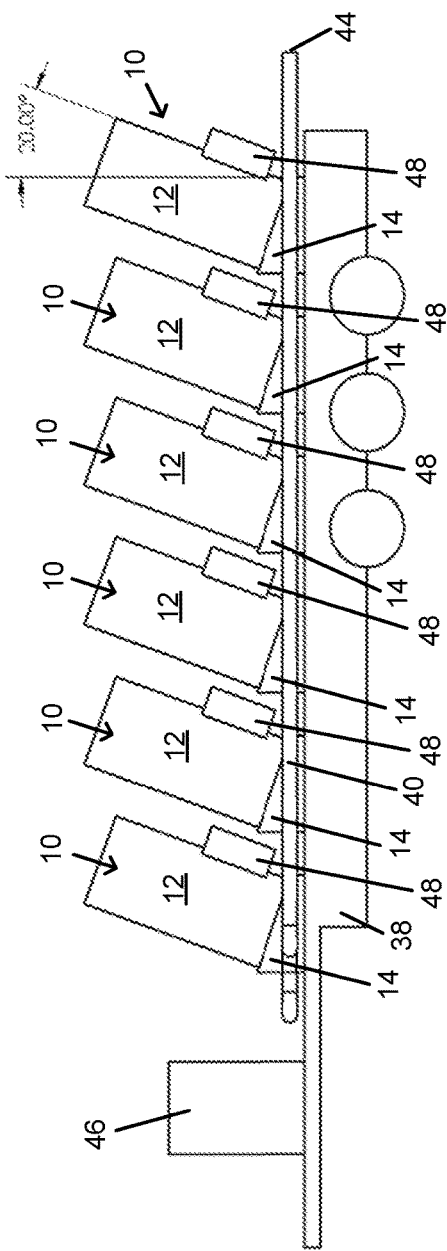

FIGS. 4A and 4B illustrate another trailer bed 38 for a hydraulic fracturing application including six pump systems 10 mounted in an angled vertical orientation and connected in parallel by pipe connections 40 between a single inlet 42 and a single outlet 44. As with FIGS. 3A and 3B, while FIGS. 4A and 4B illustrate mounting positions for pump system 10, the present discussion is equally applicable to pump system 50. The angled vertical orientation shown in FIGS. 4A and 4B allows the turbo-shaft engines 12 to be pitched backwards (e.g., about 20 degrees from vertical, or another suitable angle). As a result, the pump systems 10 still create a smaller footprint compared to traditional pump systems and conventional oil sumps 48 of the engines 12, as shown in FIG. 4B, do not need to be changed or redesigned (for example, to accommodate the full vertical orientation of FIGS. 3A and 3B).

As described above, in certain embodiments the pump systems 10 and 50 of Applicant's invention has a reduced footprint in comparison to traditional pump systems. This is advantageous in many situations. For example, because of the large size of traditional pump systems, typically only one or two pump systems can fit on a single trailer bed. Fracking applications can commonly require 20 trucks or more using pump systems with reciprocating engines or 10 trucks or more using traditional turbine-driven pump systems to obtain a necessary pressure and volume, resulting in an average of two to four days for set up. However, as shown in FIGS. 3A and 3B, because of the reduced footprint of Applicant's invention, as many as seven pump systems 10 (or pump systems 50 or a combination thereof) may fit on the same sized single trailer bed (trailer bed 38). Because fewer trucks are used, the truck set up time is reduced to about four hours.

In addition to the reduced number of trucks and set up time, the pump systems 10 of Applicant's invention also allows for reduced teardown time in comparison to using traditional pump systems. Thus, the smaller footprint of the pump systems 10 reduces the capital equipment costs of the trucks and the operational costs of transportation and maintenance. The smaller number of trucks and equipment also reduces the impact on the environment at the fracturing site.

The pump system 10 and pump system 50 of Applicant's invention also provides improvements over traditional pump systems in terms of efficiency. More specifically, the combination of the turbo-shaft engine 12 and the centrifugal pump 14 is more efficient for high pressure (e.g., greater than about 5000 psi), high volume (e.g., greater than about 65 barrels per minute per pump) applications than other conventional pump system arrangements. For example, turbine-driven reciprocating pump systems require a gearbox reduction that reduces efficiency by about 6% to 8%, while the reciprocating pump reduces efficiency by another 6%, resulting in approximately 86% efficiency from output shaft to total hydraulic horsepower. In another example, a pump system including a conventional diesel reciprocating engine driving a centrifugal pump requires a gearbox reduction that reduces efficiency by about 10% to 14%, in addition to the efficiency reduction through the centrifugal pump. Due to the elimination of a gearbox assembly, the turbine-driven centrifugal pump system 10 (or system 50) of Applicant's invention is approximately 94% efficient from output shaft to hydraulic horsepower. The higher efficiency of the turbine-driven centrifugal pump system 10 of Applicant's invention reduces fuel consumption necessary to achieve the same output as traditional assemblies, thus decreasing operational costs. In addition, due to the high efficiency output of Applicant's invention, in certain embodiments fuel additives required for traditional systems are minimized or eliminated, further decreasing operational costs.

Referring back to FIGS. 3A and 3B, in certain embodiments the trailer bed 38 also includes an auxiliary power unit (APU) 46 and one or more engine or pump system controllers (not shown). In some embodiments, the pump system controllers controls the turbo-shaft engine's compressor shaft speed (N1 speed), the turbine shaft or output shaft speed (N2 speed), the pressure at the output chamber 32, and/or the flow rate of fluid through the output chamber 32. The compressor shaft and the turbine/output shaft 16 are concentric shafts that are pneumatically coupled to each other. As will be clear to one of ordinary skill in the art, the compressor shaft creates the air pressure through the turbine-shaft engine 12 that drives the turbine/output shaft 16. The pump system controllers control the effects of engine unloading during operation of the pump systems, for example due to pressure spikes or blockages at the output chamber 32, which can cause an increase in the N2 speed. In addition, in some embodiments, mechanically blocking the output chamber 32 (e.g., via outlet valves, not shown) is necessary to unload the engine 12 and reduce the power necessary for engine startup. In other embodiments, this is not necessary due to bleed valves (not shown) positioned at the compressor section 20.

While the preferred embodiments of the present invention have been illustrated in detail, it should be apparent that modifications and adaptations to those embodiments may occur to one skilled in the art without departing from the scope of the present invention.

What is claimed is:

1. A pump system for high pressure applications, comprising:
 a first centrifugal pump including a coupling configured for attachment to a predetermined configuration of drive shaft of an engine, the first centrifugal pump further comprising:
  a split impeller having a first portion and a second portion;
  a housing formed to include a volute, wherein the first portion of the split impeller is situated in the volute; and
  a removable cap, wherein the second portion of the split impeller is covered by the removable cap.

2. The pump system of claim 1, wherein the first centrifugal pump is a high pressure centrifugal pump.

3. The pump system of claim 1, wherein the first centrifugal pump is a high rotations-per-minute ("RPM") centrifugal pump.

4. The pump system of claim 1, wherein the housing further comprises a back plate, wherein the back plate includes an inlet to receive injection of wash water.

5. The pump system of claim 1, further comprising a second centrifugal pump coupled to the drive shaft.

6. The pump system of claim 5, wherein the first centrifugal pump is a high pressure centrifugal pump and the second centrifugal pump is a low pressure centrifugal pump.

7. The pump system of claim 5, wherein the first centrifugal pump and the second centrifugal pump are high rotations-per-minute (RPM) centrifugal pumps.

8. The pump system of claim 5, wherein: the first centrifugal pump has a first diameter, the second centrifugal pump has a second diameter, and the first diameter and the second diameter differ.

9. The pump system of claim 1, further comprising an engine coupled to the first centrifugal pump.

10. The pump system of claim 9, wherein the engine and the first centrifugal pump are coupled free of any gearbox.

11. A high pressure pumping system comprising:
 a plurality of pump systems, each comprising:
  an engine; and
  a first centrifugal pump coupled to the engine, the pump having an axis of rotation; and
 a platform upon which the plurality of pump systems are mounted, wherein each of said pumps is mounted on the platform in one of the following configurations with respect to the axis of rotation of said pump: (1) vertically, (2) an angled vertical orientation.

12. The system of claim 11, wherein the plurality of pump systems includes at least four pump systems.

13. The system of claim 11, wherein:
 each of the plurality of pump systems further comprises a second centrifugal pump coupled to the drive shaft;
 the first centrifugal pump is a high pressure centrifugal pump; and
 the second centrifugal pump is a low pressure centrifugal pump.

14. The system of claim 11, wherein:
 each of the plurality of pump systems further comprises a second centrifugal pump coupled to the drive shaft; and
 the first centrifugal pump and the second centrifugal pump are high rotations-per-minute (RPM) centrifugal pumps.

15. The system of claim 11, wherein each of the pump systems is free of any gearbox between the engine and the first centrifugal pump.

* * * * *